United States Patent
Buehler et al.

(10) Patent No.: US 8,731,858 B2
(45) Date of Patent: May 20, 2014

(54) METHOD AND SYSTEM FOR CALCULATING TIMING DELAY IN A REPEATER NETWORK IN AN ELECTRONIC CIRCUIT

(75) Inventors: Markus Buehler, Schoenbuch (DE); Juergen Kuehl, Weil im Schoenbuch (DE); Markus Olbrich, Langenhagen (DE); Philipp Panitz, Garbsen (DE)

(73) Assignee: International Business Machines Corporation, Armonk, NY (US)

( * ) Notice: Subject to any disclaimer, the term of this patent is extended or adjusted under 35 U.S.C. 154(b) by 1254 days.

(21) Appl. No.: 12/577,920

(22) Filed: Oct. 13, 2009

(65) Prior Publication Data

US 2010/0100347 A1     Apr. 22, 2010

(30) Foreign Application Priority Data

Oct. 21, 2008  (EP) ..................... 08167173

(51) Int. Cl.
*G01R 29/02* (2006.01)
*G06F 17/50* (2006.01)

(52) U.S. Cl.
CPC ................. *G06F 17/5031* (2013.01)
USPC .......................................................... 702/79

(58) Field of Classification Search
CPC .................................... G06F 17/5031
USPC .......................................................... 702/79
See application file for complete search history.

(56) References Cited

U.S. PATENT DOCUMENTS 6,002,268 A * 12/1999 Sasaki et al. .................... 326/41
8,015,527 B2 * 9/2011 Buehler et al. ................ 716/108

OTHER PUBLICATIONS

Andrew Kahng et al "Nontree Routing for Reliability an Yield Improvement", IEEE Transactions on Computer-Aided Design of Integrated Circuits and Systems, vol. 23, No. 1, Jan. 2004, pp. 148-156.
Prashant Saxena et al "Repeater Scaling and Its Impact on CAD", IEE Transactions on Computer-Aided Design of Integrated Circuits and Systems, vol. 23, No. 4, Apr. 2004, pp. 451-463.

* cited by examiner

*Primary Examiner* — Bryan Bui
(74) *Attorney, Agent, or Firm* — Steven Chiu

(57) ABSTRACT

Calculating a timing delay in a repeater network in an electronic circuit. The repeater network comprises a plurality of driving cells. At least one loop comprising one or more pins and one or more driving cells for driving the loop is implemented. Each driving cell in the loop is arranged between two branches of the loop. For each driving cell, the loop is opened a plurality of times per driving cell, with one open at a time. A dedicated arrival time of a signal at each sink of the repeater network for the one open at a time per driving cell is calculated. The dedicated arrival time is stored. The calculation step and the storing step is repeated until the dedicated arrival time at each sink of the repeater network is available for each of the opens per driving cell.

20 Claims, 12 Drawing Sheets

REPEATER NETWORK FOR AN ELECTRONIC CIRCUIT

METHOD AND SYSTEM FOR CALCULATING TIMING DELAY IN A REPEATER NETWORK IN AN ELECTRONIC CIRCUIT

BACKGROUND

1. Field of the Invention

The invention relates to a method for calculating a timing delay in a repeater network in an electronic circuit according to the preambles of the independent claims.

2. Description of the Related Art

In modern chip design (VLSI) the physical feature size of electrical circuit features, such as wiring, and switching circuit elements is decreasing continuously.

With decreasing feature size opens in the chip's wiring become more and more important as functional yield detractors in chip wiring. Yield losses are directly related to the revenue of semiconductor companies. Nevertheless, the impact of variation increases and endangers parametric yield. The augmentation of Steiner trees as published by Kahng et al. in "Nontree routing for reliability and yield improvement", IEEE Transactions on Computer-Aided-Design of Integrated Circuits and Systems, January 2004, p. 148-156, or by Panitz et al. in "Robust Wiring Networks for DfY Considering Timing Constraints", Proceedings of the Great Lakes Symposium on VLSI, May 2007, p. 43-48, is applied to achieve robustness against opens in unrepeated signal nets. Steiner trees offer a network geometry having the shortest wiring for interconnecting between source and sinks.

It is known that the wire length between repeaters in an optimal buffered line decreases with shrinking technology. It is predicted by Saxena et al. in "Repeater Scaling and its Impact on CAD", IEEE Transactions on Computer-Aided-Design of Integrated Circuits and Systems, April 2004, p. 451-463, that 70% of all cells will be repeaters at the 32 nm node.

To overcome this issue, an approach has been proposed in the U.S. patent application Ser. No. 12/166,012 to apply wire and gate redundancy on repeater networks. FIG. 1a depicts an example of such a repeater network. A wiring loop or loop-like structure is applied to connect all sinks (output pins displayed as black squares) of the buffer or repeater network 100. The repeater network 100 is supplied by a source 110. "Sink" and "source" refer always to a "pin". An output pin refers to a sink or sink pin, whereas an input pin refers to a source pin. Then multiple repeaters 112, 114, 116 are distributed at input pins 120, 122, 124 on the loop to drive the load in the loop caused by interconnects and active circuits attached to the output pins of the loop. The approach is either applied in a cascaded way if the load cannot be driven by a single source or a tree connects the repeater cells to the source. This approach offers robustness against wire and via opens, circuit malfunctions and variation. An important aspect concerning the applicability of the proposed topology is the timing analysis. Static timing analysis models the worst case with respect to a specific timing test in order to guarantee the correct behavior of the circuit.

State-of-the art delay calculation is capable of analyzing wiring loops but there is no known solution to model the worst case in a net with opens and multiple gates with different signal-arrival times at their inputs. Chips that do not operate correctly due to opens can easily be found by static scan testing assuming stuck-at-faults, if the opens are not masked by wiring redundancy. On the other hand, if opens are masked by wiring redundancy, they may cause a parametric fail which is only detectable by delay tests. However, delay tests are too costly to be implemented for most semi-custom applications.

Therefore, static timing analysis (STA) has to model the worst delay in a net with respect to a specific timing test. The setup test checks if a signal arrives in time at the latch input to be stored. This test applies the late mode (LM) assuming the maximum possible delay for each net. In contrast, the hold test checks if the next data does not arrive too early in order to overwrite the data to be stored by a latch. The delays have to be calculated in early mode (EM) assuming the minimum possible delay for a net. As timing verification is computationally extensive the objective is to restrict the number of timing runs.

A known and simplistic solution is to assume an open anywhere in the wiring and calculate the delay looking for the maximum and minimum value. As there are infinite possible open positions that lead to an infinite number of delay calculations this can be approximated by a finite but high number in praxis, e.g. by Monte-Carlo simulation. Furthermore, the number of delay calculations depends on the underlying routing grid that has a fine granularity in most applications.

BRIEF SUMMARY

It is an objective of the invention to provide a method for calculating timing delays of repeater networks in an electronic circuit. Another objective is to provide a system for calculating timing delays of repeater networks in an electronic circuit.

The objectives are achieved by the features of the independent claims. The other claims and the description disclose advantageous embodiments of the invention.

A method is proposed for calculating a timing delay from the source to each individual sink in a repeater network in an electronic circuit, said repeater network comprising a plurality of driving cells, comprising the steps of implementing at least one loop comprising one or more pins and one or more driving cells for driving the loop, wherein each driving cell in the loop is arranged between two branches of the loop; for each driving cell, opening the loop p-times per driving cell, with one open at a time; calculating a dedicated arrival time of a signal at each sink of the repeater network for the one open at a time per driving cell; storing the dedicated arrival time; repeating the calculation step and the storing step until the dedicated arrival time at each sink of the repeater network is available for each one open per driving cell.

The repeater network can consist of a plurality of nets which can comprise one or more signal sources and one or more signal sinks. Generally, a signal sink in a preceeding stage is a signal source for a subsequent stage. A signal source in a net is a driving cell, also known in the art as "driving gate". Typically, a stage comprises one or more signal sources, a network and one or more signal sinks. In a repeater network, driving cells are active circuits which propagate a signal either as an identical signal or as an inverted signal. According to the invention, the worst delay between the signal source of the repeater network and the sinks of the repeater network can be determined. Favourably, the method according to the invention allows for calculating maximum and/or minimum delay times in a very efficient manner.

Preferably, the dedicated locations of the opens are locations which can cause the worst delay. The worst delay can be a worst delay for late mode or a worst delay for early mode. Late mode means that a signal arrives too late at e.g. a latch input to be stored. Early mode means that a signal arrives too early causing overwriting the data to be stored by a latch.

Signal delays can advantageously be estimated of a long buffered wire consisting of identical stages, particularly repeater stages, each of which consists of a repeater cell (with effective driver resistance, diffusion and gate capacitance and size) driving a wire that can be modeled with a RC wire model.

The proposed method offers time efficient routing of wires of an electronic circuit which is resistant to opens, wherein global wiring redundancy by wiring loops is assumed and static timing analysis is performed which relies on the worst case delay values calculated by the proposed method.

In the context of the present invention a pin is the connection point of a cell. There exist input and output pins with respect to the signal flow direction. Pins may be positioned on grid nodes, but are not obliged to. A grid node is the connection point of vertical and horizontal edges of a routing grid. A net is a logical connection between two pins. A single source net consists of exactly one driving cell and one or more sinks.

Further, a wiring grid, or routing grid, is the discretization of the electronic circuit area. Wires may be positioned on the edges of the grid. The edges have a constant distance from each other, the wiring pitch. The wiring pitch results from the minimum wire thickness plus the minimum distance one from each other.

A driving cell is the cell driving a net, more precisely the output of which is connected to a net. In the present invention a driving cell is a repeater cell, except for the original root of the repeater network which may be any cell, such as a repeater, a logic cell, a latch, a macro or the like.

A repeater network is a multistage network consisting of a plurality of driving cells. A normal network consists of one driving cell and one or more sinks. If the number of sinks is too high or the wire lengths are too long, one driving cell is not sufficient to drive a plurality of sinks. Therefore repeater networks are used. Usually, repeater networks are constructed tree-like, which means one driving cell is driving a plurality of sinks. According to the present invention nets can be driven with a plurality of drivers. Sinks are circuits that receive the signal from the net. Normally, a net consists of one source and a plurality of sinks. In the present invention a net can also consist of a plurality, but logically equivalent sources. A sink may be the input of a repeater cell or the input of a logic cell. A sink may be the output of a loop, too.

Favorably, the dedicated arrival time can be a maximum possible delay in a late mode. The dedicated arrival time can be a minimum possible delay in an early mode.

Advantageously, the number of delay calculations does not depend on the grid or the segmentation of the wiring.

According to a preferred development, for determining the dedicated arrival time corresponding to the maximum possible delay, p=3 opens are produced with one open in the one of two branches emanating from the actual driving cell, one open in the other of the two branches emanating from the actual driving cell and a disconnection of the driving cell itself from the loop. This can result in performing only 3N timing delay calculations for worst delay in late mode, wherein N is the number of driving cells in the repeater network.

Disconnection of the driving cell is not very likely. Thus, alternatively, when disconnecting of the driving cell itself is not considered, determining the dedicated arrival time corresponding to the maximum possible delay in this case is done by producing p=2 opens with one open in one of the two branches emanating from the actual driving cell and one open in the other of the two branches emanating from the actual driving cell. Here, only 2N timing delay calculations need to be performed, wherein N is the number of driving cells in the repeater network.

According to a further preferred development of the invention, for determining the dedicated arrival time corresponding to the minimum possible delay, the dedicated locations can be an open in one of the two branches emanating from the actual driving cell, in the other of the two branches emanating from the actual driving cell and one open on each side of each sink. This can favorably result in performing only 2*(N+M) timing delay calculations for the worst delay in early mode, wherein N is the number of driving cells in the repeater network and M is the number of last stage sinks.

Alternatively, for each branch in the loop the steps can be performed of calculating a dedicated arrival time for each pin for one open at a time in the branch, wherein the dedicated arrival time is calculated alternating from both sides of the actual branch for the same open, yielding a first and a second dedicated arrival time for each pin; and storing the dedicated arrival time for each open in the branch. In this alternative procedure, the number of delay calculations of worst delay in early mode can be further reduced below a number of 2*(N+M) calculations.

The calculation of the dedicated arrival time can be aborted when the dedicated arrival time is calculated at a pin the second time.

When the dedicated arrival time is calculated at a pin the second time, the calculation of the dedicated arrival time can be aborted if the second dedicated arrival time at the actual pin is larger than the first dedicated arrival time at the actual pin.

Preferably, the maximum and the minimum value of the dedicated arrival time, i.e. worst delay in late mode and worst delay in early mode, can be stored for each sink of the repeater network.

With the worst delay late mode and worst delay early mode delay times it is possible to decide if a repeater network is robust against opens. Preferably, if the determined maximum delay time (worst delay late mode) for each pin in the repeater network is below a predetermined threshold and the determined minimum delay time (worst delay early mode) for each pin in the repeater network is above a predetermined threshold, the repeater network will not cause timing failures of the circuit.

According to further aspect of the invention, a tool for calculating a timing delay in a repeater network in an electronic circuit is proposed, said repeater network comprising a plurality of driving cells, said tool comprising software code portions for performing a method comprising the steps of implementing at least one loop comprising one or more pins and one or more driving cells for driving the loop, wherein each driving cell in the loop is arranged between two branches of the loop; for each driving cell, opening the loop p-times per driving cell, with one open at a time; calculating a dedicated arrival time of a signal at each sink of the repeater network for the one open at a time per driving cell; storing the dedicated arrival time; repeating the calculation step and the storing step until the dedicated arrival time at each sink of the repeater network is available for each one open per driving cell. The loop can have subtrees rooted at the loop. Preferably, only one loop is in the net.

According to still a further aspect of the invention, a data processing program for execution in a data processing system is proposed, which comprises software code portions for performing the said delay calculation method when said program is run on a computer.

The invention can be favorably applied for parametric testing of an electronic circuit design during a design phase.

Recapitulatory, the present invention provides for the applicability of robust wiring networks (including wiring and gate redundancy) with respect to performance constraints. The proposed method offers the advantage that the number of delay calculations does not depend on the grid or the segmentation of the wiring.

BRIEF DESCRIPTION OF THE SEVERAL VIEWS OF THE DRAWINGS

The present invention together with the above-mentioned and other objects and advantages may best be understood from the following detailed description of the embodiments, but not restricted to the embodiments, wherein is shown in:

FIG. 2 possible conditions for short circuit currents in the topography of FIG. 1a;

DETAILED DESCRIPTION

Figure 1A:
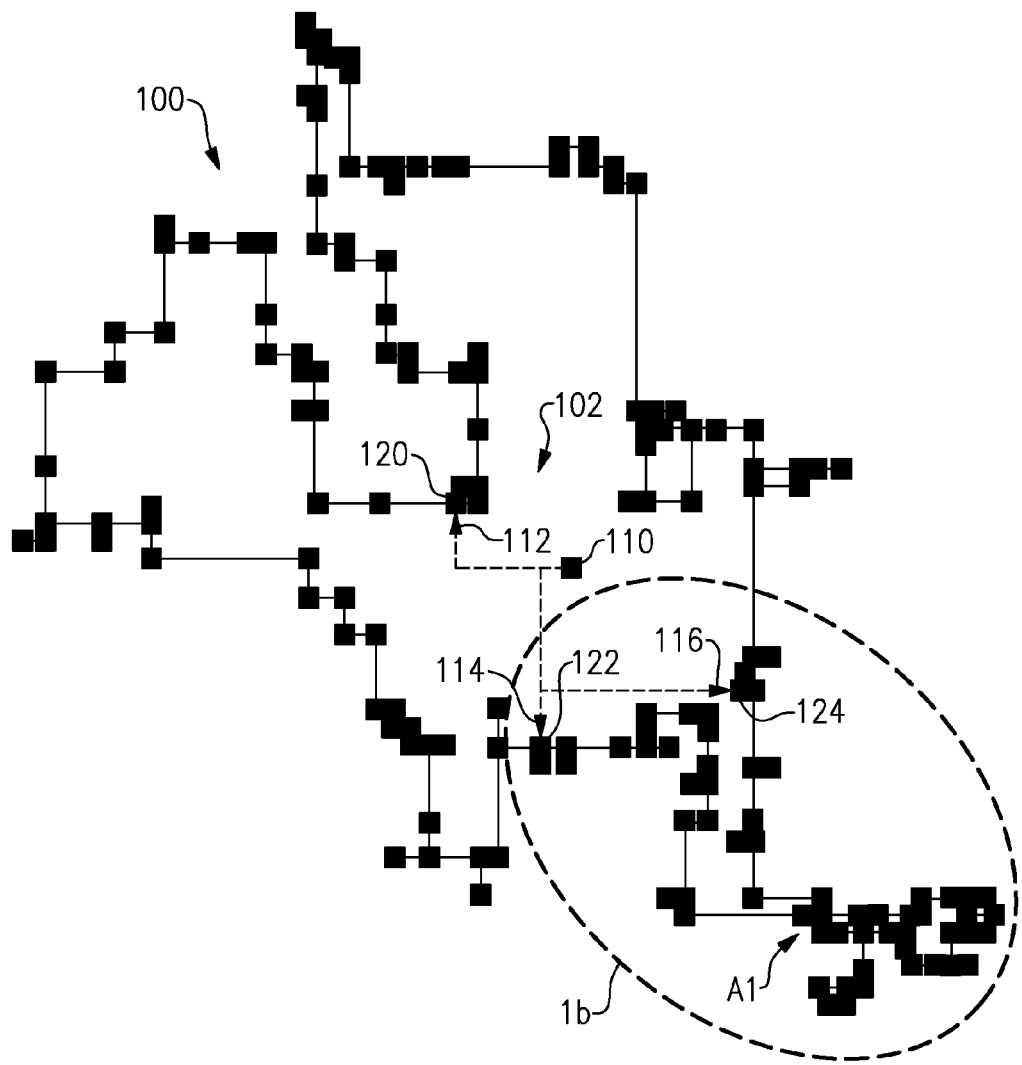
FIG. 1a-1c a prior art topography of a preferred repeater network for an electronic circuit (FIG. 1a), a part of the repeater network modeled as RC network (FIG. 1b) and a cascaded application of loops in a repeater network (FIG. 1c)

In the drawings, equal or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention.

According to the invention, a method for calculating a timing delay of a repeater network in an electronic circuit is proposed, comprising the steps of implementing at least one loop comprising one or more pins and one or more driving cells for driving the loop, wherein each driving cell in the loop is arranged between two branches; for each driving cell, opening the loop at a predefined number n of dedicated locations at one location at a time; calculating a dedicated arrival time of a signal at each pin of the loop for the opened loop; storing the dedicated arrival time; repeating the calculation step and the storing step until the dedicated arrival time at each sink of the repeater network is available for an open at each predefined location. Favorably, the loop is opened at the indicated locations whereas the delay is calculated from the signal source to the signal sinks.

State of the art semiconductor have several 10 millions of electrical interconnects. In order to obtain a reasonable yield the probability of an open in a given net must be in the order of $10^{-7}$. Thus, more than one open in a net is extremely unlikely. According to the present invention the highest/lowest delay is defined that occurs under worst case manufacturing and environmental conditions and a single open in a loop as the worst delay (WD) for both late mode (WD-LM) and early mode (WD-EM).

The worst delay considering a single open can always be calculated by assuming an open anywhere in the net and taking the maximum and minimum value of all delay calculations for late mode and early mode, respectively. In most cases this is prohibitive due to the size of repeater networks and the granularity of the wiring grid.

A solution which has been proposed in the art is to calculate the WD-LM for single source signal nets is to open each loop directly behind the node where the paths that form the loop branch coming from the source. This method, however, is strictly restricted to single source nets and is not applicable for repeater networks.

The present invention extends this solution in order to calculate the highest and lowest delay in repeater networks with wiring redundancy as depicted in FIG. 1a. Furthermore the (WD-EM) in a single source signal net is covered by the present invention.

As already described, FIG. 1a depicts a preferred topology which can be handled with the present inventions. Particularly, FIG. 1a comprises a tree 102 (comprising the connections emanating from a source 110 to pins 120, 122, 124) which drives a loop, which is also called a wiring loop. The tree 102 and the loop form a so called stage. The wiring loop or loop-like structure is applied to connect all sinks depicted as squares of the repeater network 100. The repeater network 100 is also called buffer network. As mentioned above, the repeater network 100 is supplied by the source 110. Then multiple repeaters 112, 114, 116 are distributed on the loop to drive the load.

If signal arrival times at the pins 120, 122, 124 and an open location that leads to the set of open locations that lead to the WD-LM/WD-EM are known a priori, the number of delay calculations can be restricted. The pins 120, 122 and 124 form inputs or nodes for the loop. To restrict the number of delay calculations is vitally important to enable the applicability of said repeater networks in great quantity.

Figure 1B:
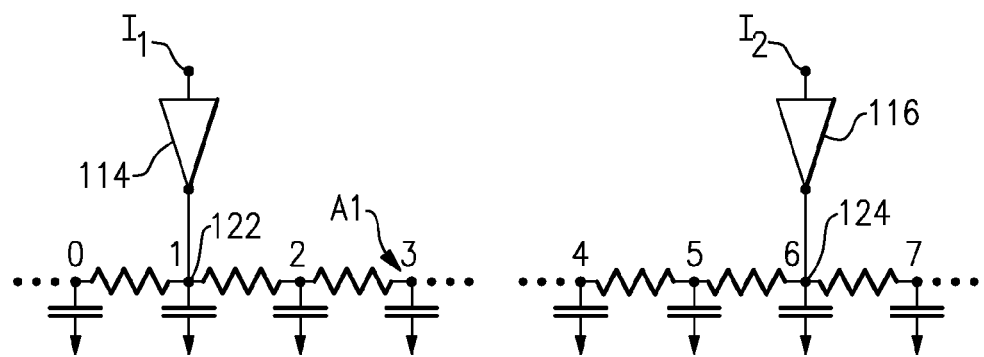

FIG. 1b depicts how the repeater network 100 can be modeled as RC network modeled with resistors and capacitors resulting from the interconnects and the signals sinks in the loop. A sink A1 on the loop becomes a node A1 in the RC model. The RC model represents a topology and is therefore not related to a specific physical location in the layout of a corresponding microelectronic circuit. The loop is by way of example a part of the repeater network 100 of FIG. 1a, marked inside the oval element Ib.

Figure 1C:
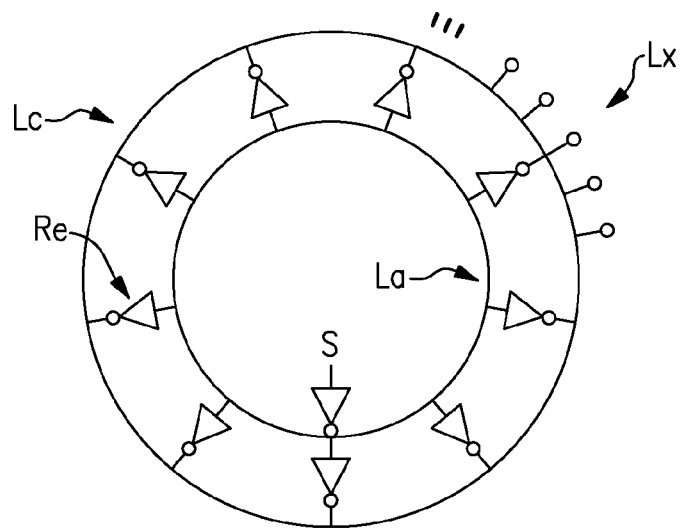

FIG. 1c depicts a so called cascaded application of loops in a repeater network. An electrical signal S is propagated via a first repeater stage implemented as loop La to the repeater cells Re that drive a second stage also implemented as a loop 100c. An arbitrary number of loops (indicated by Lx) can be applied in this manner.

According to the invention, it is suggested to drive nets with not only one but a multitude of drivers. However, the application of multiple drivers in a net can be harmful, because there may be a short circuit current flowing from the positive supply voltage VDD of the electronic circuit to ground GND. It can be shown that the proposed structure of the preferred repeater network 100 in FIG. 1a in itself prevents this effect as illustrated in FIG. 2.

Figure 2:
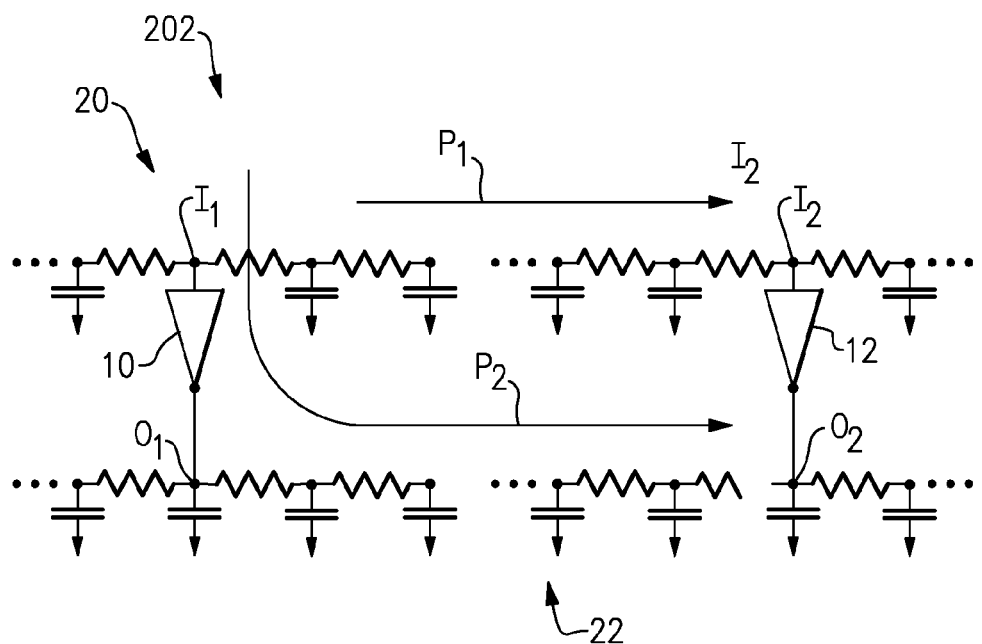

FIG. 2 shows a pair of adjacent inverters, presented as nodes 10, 12, in a model circuit 202 connected by a first RC network 20 of resistors R and capacitors C between I1 and I2 on the input side and by a second RC network 22 of resistors R and capacitors C between O1 and O2 on the output side. A short circuit current will flow if the signal via the path P2 from the first RC network 20 through the second RC network 22 is faster than the signal via the path P1 and reaches O2 before a transition is caused at the input network. The signal propagation delay is determined by gate delays and the interconnect length that acts as load. As the interconnects on the output network are usually larger as on the input network (see e.g. wire length between the inputs of inverter 114 and 116 in FIG. 1 is much shorter than wire length between the output pins 122 and 124) the short circuit current is negligible in most cases. If this is not the case it is always possible to balance the arrival times at I1 and I2 by placing a driving cell (not shown) between both nodes 10, 12 or apply balanced routing trees.

Figure 3:
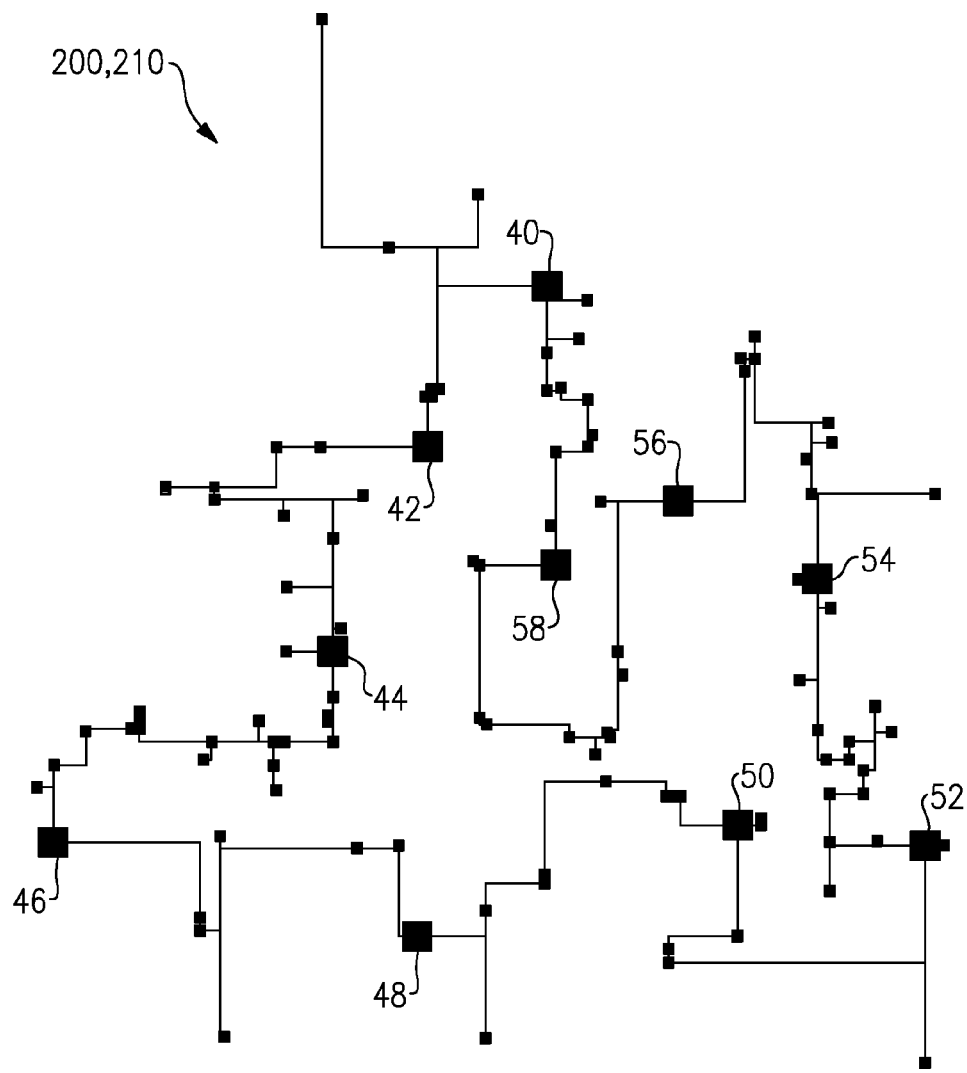
FIG. 3 a last repeater stage of a robust repeater network according to the invention.

FIG. 3 shows by way of example a last repeater stage of a preferred robust repeater network 200 according to the invention, wherein the last repeater stage is represented by a wiring loop 210 with e.g. ten repeaters embodied as driving cells 40, 42, 44, 46, 48, 50, 52, 54, 56, 58 driving the loop 210. The wires (straight lines in the FIG. 3 connecting the pins) and the pins (small squares in the straight lines and/or at the ends of the straight lines) between the various driving cells 40-58 in the loop 210 are not denoted with reference numerals for better recognizability.

In order to shown which combination of arrival times and open locations lead to the worst delay, in the routing grid corresponding to the loop 210 it is assumed that it suffices to open each edge of the routing grid that is occupied by a wire at both nodes incident to the edge and calculate the delay of the signal caused by the open, and it is further assumed that the net's wiring segments occupy a constant fraction of the grid. Therefore, the number of delay calculations depends on the number of grid edges. A minimum grid to house all net edges and net nodes is the Hanan grid. A Hanan grid is formed by simply drawing a vertical and a horizontal line through each pin.

The number of Hanan nodes and edges depends quadratically on the number of pins. Therefore, the number of delay calculations is at least $rT^2$, whereas T is the number of pins in the net and r is the fraction of occupied grid edges. It is to be noted that this is an optimistic estimation because the Hanan grid is a minimum grid. Grids applied in practice are usually much denser. Especially, for high fan-outs the present invention provides vast runtime savings. Another possibility is to apply Monte-Carlo methods and randomly assume opens on the wiring. If the worst delay is stored for each pin in each iteration and the number of iterations is high enough (e.g. multiple thousand runs), there is a certain probability that the WD is captured. Thus, Monte-Carlo-based methods are prohibitive due to runtime reasons.

As the single open assumption holds, it can restrict the considerations in the present invention to a single open in the network.

Two cases have to be distinguished:

Case 1: If the open is in the last repeater stage, the arrival times (arrival time=AT) and the signal slews at the inverter inputs are known for LM and EM due to timing analysis of previous repeater stages.

Case 2: If the open affects a previous repeater stage, the question has to be answered where the open has the most severe impact on the source to sink delay. Additionally, it is further distinguished between LM and EM:

First, the worst delay in late mode (WD-LM) is considered. Starting with case 1 in LM, the LM arrival times and slews are known at the repeater inputs in order to calculate the WD-LM. First, a timing analysis assuming no open is performed. The core idea of WD-LM calculation is to determine the set of possibly worst opens. A worst open is the open that causes the worst delay for one or multiple sinks. If the locations of possibly worst opens are known a priori, it is possible to open the network at one location at a time and repeatedly calculate the delay. Last, the maximum delay is stored at each pin. The number of delay calculations can be restricted to 2N, whereas N is the number of repeater cells 40-58 driving the loop 210. The locations 120, 122 on the loop 210 that lead to the WD-LM are exemplarily depicted in FIG. 4 by arrows 62, 64 pointing at the repeater cells 52 and 54.

It suffices to disconnect all edges incident to a node where a repeater cell is connected to the loop 210. This can be explained according to a simple RC delay formula, known as Elmore delay (ED):

$$T_{di} = \sum_{k=1}^{N} R_{ik} C_k$$

The Elmore delay expresses that the signal propagation delay depends on the resistive path from the input node to the considered node i and the capacitance in the network.

Figure 5:
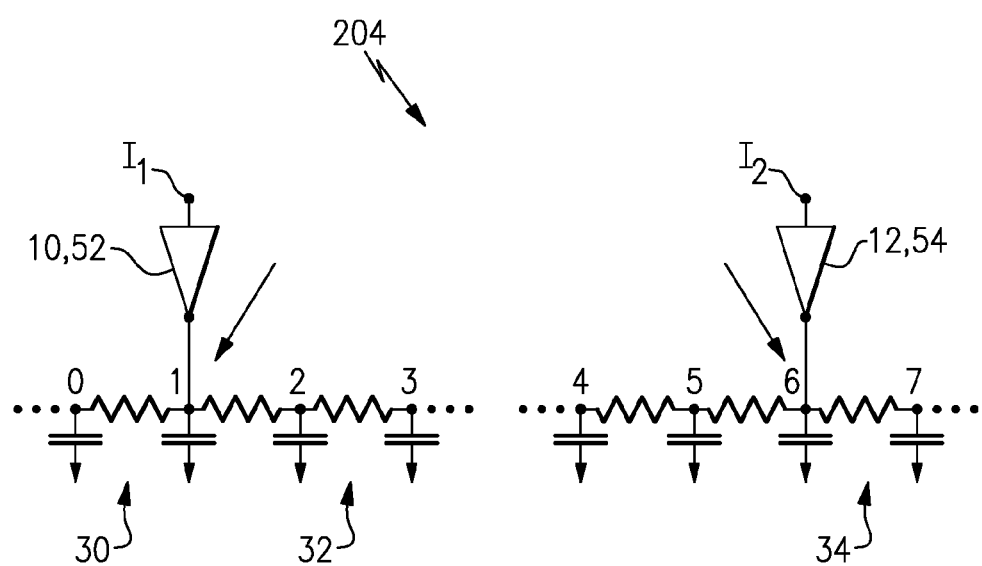
FIG. 5 an RC model of the loop in FIG. 4 between two nodes of driving cells.

Consider a sink that is on the loop or connected to the loop somewhere between the two nodes 10 and 12 of two adjacent repeater cells 52 and 54 connected by a branch 32 in FIG. 5. The repeater cells 52, 54 are also called driving cells 52, 54 in the present invention. A branch 30 emanates from the left side of the first driving cell 52 and a branch 34 emanates from the right side of the second driving cell 54. "Left" and "right" refer to the drawing representing a topology, and not to a particular location in a corresponding physical layout. The wiring 204 is modeled as lumped RC network with output nodes 0-7 (also called pins) as it is state-of-the-art (depicted in FIG. 5). There may be subtrees rooted at the loop. The capacitance of those subtrees is expressed as one lumped capacitance connected to the loop which does not change the ED because the subtree is not on the path from the source to the sink i. If an open occurs somewhere on the considered part of the loop and disconnects the sink from one driving cell 52, indicated by an arrow pointing at the driving cell 52, it is still driven via the remaining connection by the other driving cell 54. On the one hand, the load of the driving cell 54 is increased because without interruption the load was partly driven by the other driving cell 52 which simultaneously increases the gate delay of the driving cell 54.

On the other hand, the wiring delay from the repeater output (node 6) of the second driving cell 54 to the sink is increased. If the sink is close to node 6 the capacitance behind the sink according to the ED is increased, which increases the delay on the wiring 204. If the sink is distant to node 6 the resistive path to the sink is increased, which also increases the wiring delay. The question concerning the maximum delay increase can be easily answered. It can be shown by contradiction that an interruption somewhere between the two inverter outputs (node 1 of the first driving cell 52 and node 6 of the second driving cell 54) cannot be the worst open. An arbitrary open and an arbitrary node is assumed. The ED is maximized by maximizing the capacitance behind the node, which is the case if the interruption takes place directly before the other driving cell. Also the repeater delay is maximized if the load is maximized which also happens if the open is close to the other repeater. Therefore, one of the possibly worst opens according to FIG. 5 leads to the maximal delay, independently on the arrival time at the inputs.

Considering now case 2 in late mode LM, there may be previous stages containing loops. An open that is not on the last stage of the considered repeater network 200 (FIG. 4) leads to changed signal arrival time and a changed slew at the repeater inputs of the last stage, which in turn leads to a changed delay to the sinks. A delayed signal arrival time is propagated through the gate and an increased slew increases the gate delay and the gate output slew. Therefore, the latest signal arrival time and the most degraded slew at the stage previous to the last stage yields the WD-LM at the last stage. The sinks of the previous stage are the inputs to the last repeater stage. Case 1 in LM described the locations of possibly worst opens of a repeater stage with respect to the sinks. From the recursive application of Case 1 in connection with the single open assumption it follows that possibly worst open locations are all wiring edges connected to the driving cells of a repeater stage.

As there are internal wires in the driving cells themselves it is also possible that the driving cell itself is disconnected from the loop. Although unlikely, this is also a possible worst open. For the node that is directly connected to the cell output this increases the signal arrival time because they have to be loaded via an adjacent driving cell. Due to different distances between driving cells on the loop there may be an increase in the load for a remaining driving cell, if a driving cell is disconnected. Additionally, the removal of a driving cell with an early arrival time may further delay the signal's arrival. Note, that the driving cell internal wire length is short and the described situation, therefore, extremely unlikely.

Because there are two edges on the loop which are connected to the driving cell, this method results in 2N delay calculations, whereas N is the number of driving cells in the network. If the situation of disconnected driving cells should be included into the analysis, the number of timing runs is 3N.

Figure 4:
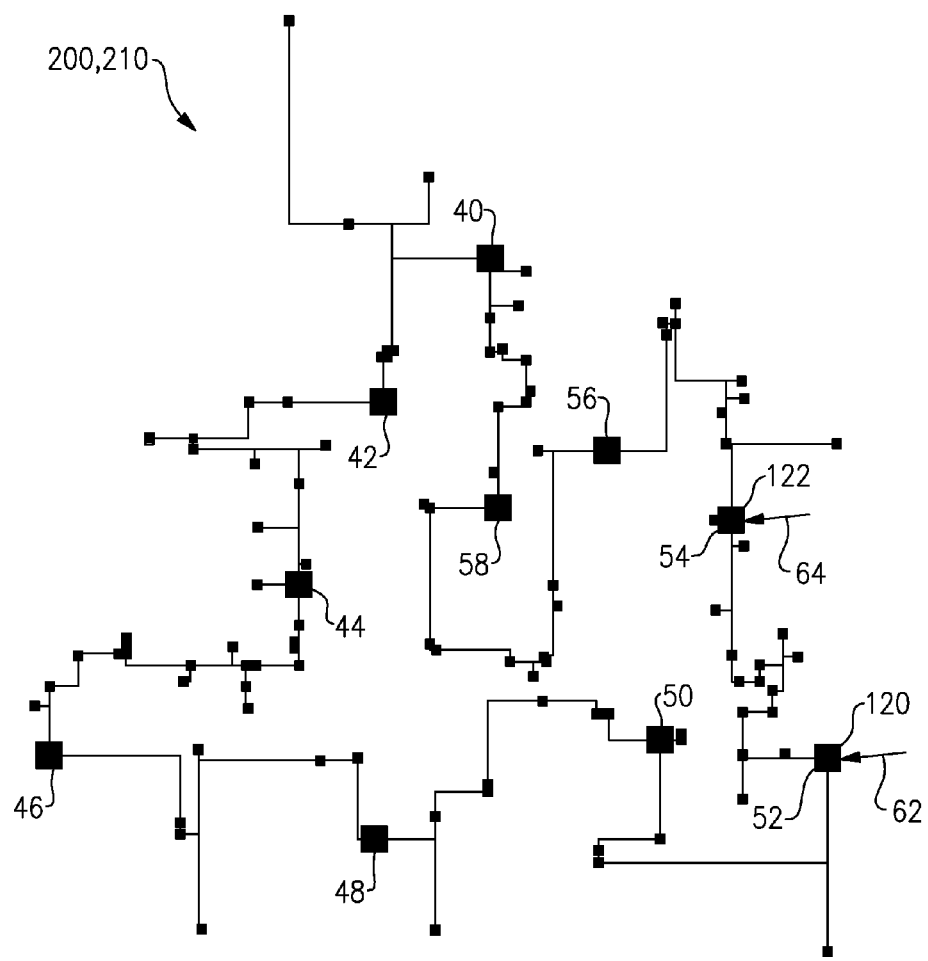
FIG. 4 examples of possible locations of opens causing a worst delay in a preferred loop according to the invention.
Figure 8:
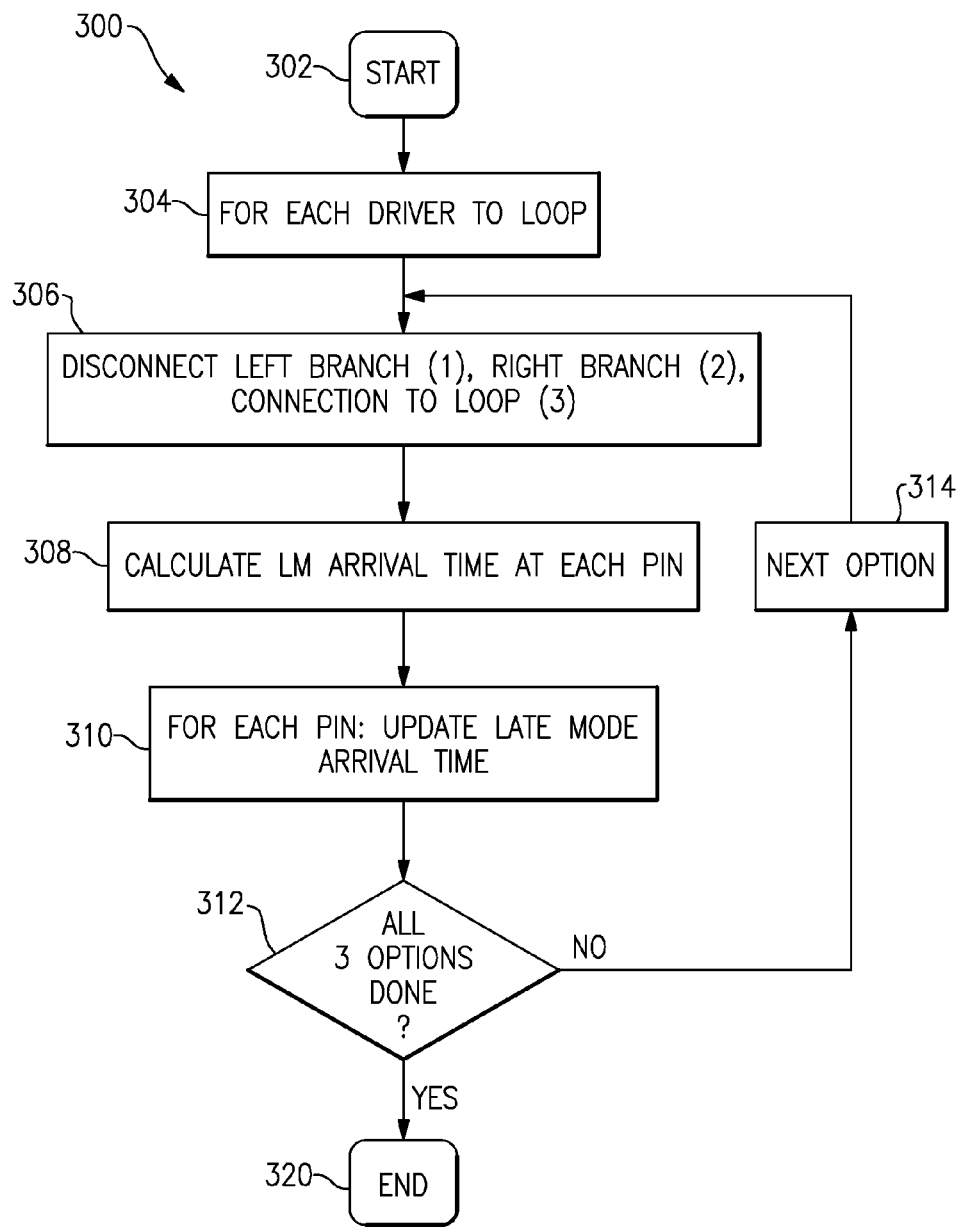
FIG. 8 a flow chart of a late mode timing process.

A summary of the process is depicted in the flowchart 300 in FIG. 8. FIG. 8 illustrates a late mode timing process. With reference to FIG. 4 showing a last stage of a repeater network, the routine starts in step 302. For each driving cell 40-58 connected to the loop 210 (step 304), an open is produced by disconnecting at a predefined number n of dedicated locations 120, 122 at one location 120, 122 at a time (step 306). Then a dedicated arrival time of the signal at each pin, here the late mode arrival time, is calculated at each pin in step 308 and for each pin the late mode arrival time is stored, if the value increases (step 310). In step 312 it is verified if all options have been done. If the answer is no, the next option is selected in step 314 and steps 306, 308 and 310 are repeated until all options have been done. When all options have been done, the answer is yes and the routine ends in step 320.

To summarize, in the late mode case a loop is opened on both paths emanating from a driver output (source of the repeater network) directly behind the driver output. Subsequently the delay is determined from the source to all sinks of the repeater network, and for each sink the maximum delay of all calculations is stored.

By way of example, for determining the worst delay late mode for the last repeater stage (case 1) or a previous repeater stage (case 2) three options (n=3) have to be considered, i.e. the left branch emanating from the particular driving cell has to be disconnected (option 1), the right branch emanating from the particular driving cell has to be disconnected (option 2) and the connection of the driving cell itself has to be disconnected (option 3). "Left" and "right" refer to a position in the drawing and not to a concrete position on a corresponding microelectronic chip.

Now, the worst delay in early mode (WD-EM) is considered. For case 1 (last repeater stage), the WD-EM is the earliest arrival time at the sinks concerning a single open. The acceleration of signal transportation is caused by the reduction of the load a gate, i.e. a driving cell, has to drive.

Figure 6:
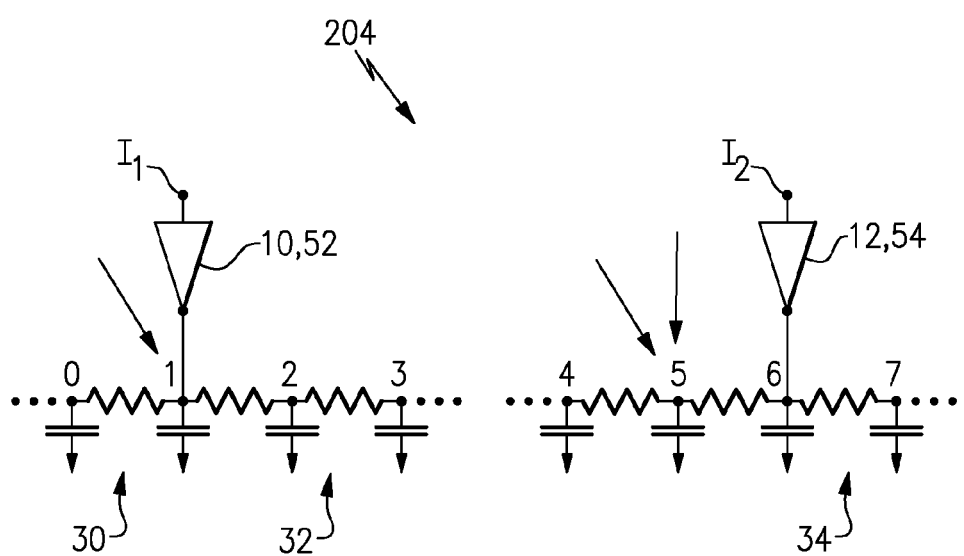
FIG. 6 an RC model of the loop in FIG. 4 indicating worst delay early mode locations between two nodes of driving cells.

Consider a generic situation depicted in FIG. 6. Again, the part of the loop between two nodes 10, 12 of the repeater cells 52 and 54 is depicted and the wiring 204 is modeled as lumped RC elements. A sink is assumed somewhere between the output nodes 1 and 6. For instance, the sink is assumed to be node 5, indicated by arrows pointing at node 5.

The signal arrival time at the sink can be decreased in two cases. First, if the open disconnects the loop on the left branch emanating from repeater cell 52 directly behind the output node 10 of the first repeater cell 52 and partly removes the load from the node 10 the load is reduced. Second, load can be reduced if the loop is disconnected directly behind the sink (node 5) which removes the load behind the sink (node 5) from the node 10, thus leads to a decreased delay. Challenging is the ambiguity of the expression "behind" due to the multiple gates. This can be solved by opening the loop at both sides of the sink (node 5). The possibly worst opens for WD-EM are marked by arrows. As the loop is opened directly behind the driving cells during the WD-LM calculation, the fastest arrival time can also be stored during that procedure which saves computation time.

Now case 2 in early mode is considered. The reasoning is the same as for late mode. Because the arrival time at the input is propagated to the output and the reduced load decreases the gate input slew, hence gate delay, opens on previous stages that cause a speed-up at that stage also cause a reduced delay to the sinks. The maximal delay decrease has to be determined which can be done as described in case 1.

In contrast to the LM analysis the disconnection of a driving cell from the loop does not play a role in EM because the arrival time cannot be decreased by the removal of a cell. Only if a cell with a very late signal arrival time (such that the signal arrives earlier via an adjacent driving cell) is connected to the driving cell its removal will speed up the signal. This situation has to be avoided to prevent a short circuit current, hence has not to be considered in timing analysis.

Therefore, 2(N+M) timing calculations have to be performed, whereas M is the number of last stage sinks and N is the number of repeaters in the networks. As repeaters are the sinks of previous levels, the number of delay calculations is also affected by N.

Figure 9:
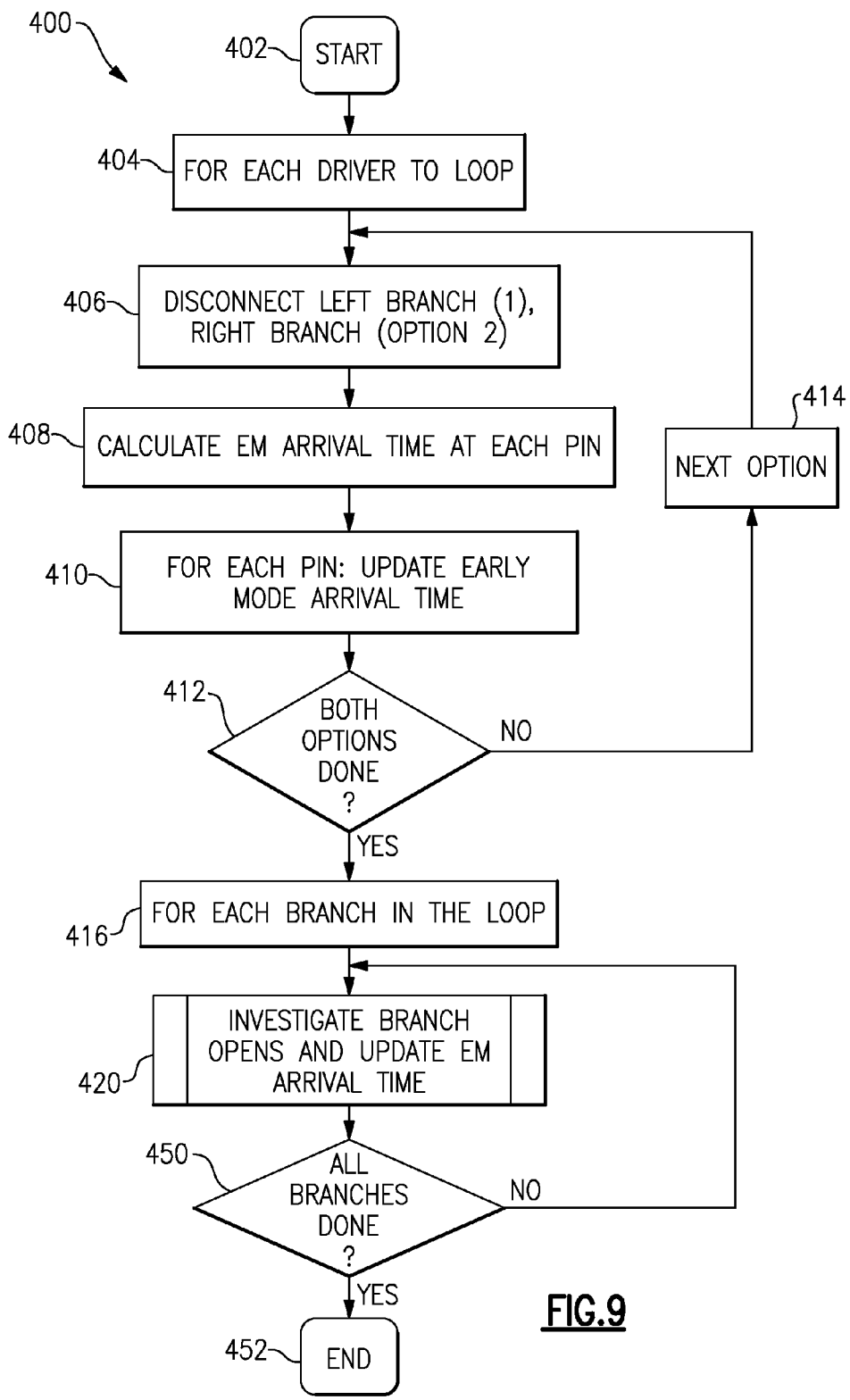
FIG. 9 a flow chart of a main algorithm for an early mode analysis.

A summary of the process is depicted in the flowchart 300 in FIG. 9. FIG. 9 illustrates an early mode timing process. With reference to FIG. 4 showing a stage of a repeater network, the routine starts in step 402. For each driving cell 40-58 connected to the loop 210 (step 404), an open is produced by disconnecting at a predefined number p of dedicated locations 120, 122 at one location 120, 122 at a time (step 406). Then a dedicated arrival time of the signal at each pin, here the early mode arrival time, is calculated at each pin in step 408 and for each pin the early mode arrival time is stored, preferably updated so that the minimum value is kept (step 410). In step 412 it is verified if all options have been done. If the answer is no, the next option is selected in step 414 and steps 406, 408 and 410 are repeated until all options have been done. When all options have been done, the answer is yes and the routine continues with step 416, where for each branch in the loop branch opens are investigated and early mode arrival times are stored, preferably updated in subroutine step 420. A branch open denotes a disconnection on both sides of the signal sink as shown in FIG. 6. When this has been done for all branches in the loop, the routine ends in step 452.

To summarize, in the early mode case a loop is opened on both paths emanating from a driver output (source of the repeater network) directly behind the driver output. Additionally, the loop is opened on both sides of the signal sink. Subsequently, the delay is determined from the source to all sinks of the repeater network. For each sink the minimum delay of all calculations is stored.

By way of example, for determining the worst delay early mode for the last repeater stage (case 1) or a previous repeater stage (case 2) two options (p=2) have to be considered, i.e. the loop has to be disconnected on both sides of each sink on the loop or on both sides of the vertex a subtree is rooted at, if a sink is in the subtree.

The number of sinks may be quite high in repeater networks. In practice the number of delay calculations can be further reduced for considering to investigating of the branch opens (step 420). Let the nodes 2, 3, 4, 5 be sinks in FIG. 7. The approach starts from both sides of the connection (node 1 and node 6), assumes an open behind the sink encountered from the side and calculates the delay. This is done alternating from both sides until the delay is calculated at a sink the second time. If the second calculated delay (from the second side) is larger than the first calculated delay (from the first side) the delay calculation can be aborted, because the delay to this and the previous sinks will only be larger, if the next sink on the path will be considered. For instance, the delay calculation at node 3 yields e.g. 120 ps assuming an open behind node 3 coming from the first driving cell 52. Then the delay is calculated assuming an open behind node 3 coming from the second driving cell 54. This calculation yields e.g. 140 ps. The delay calculation can be stopped because assuming an open behind node 2 coming from the second repeater cell 54 would increase the delay at node 3.

Figure 10:
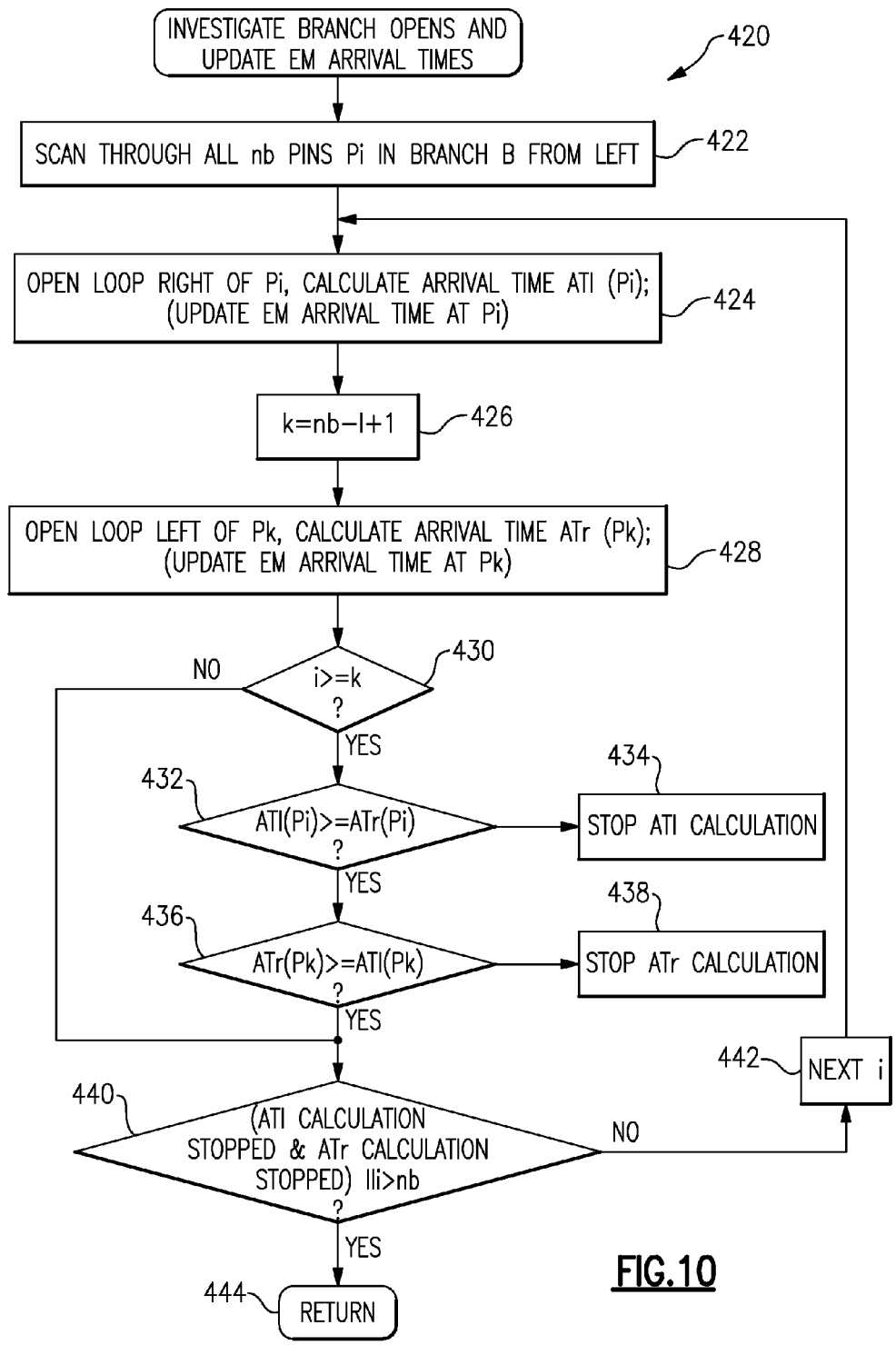
FIG. 10 a flow chart of a subroutine of the main algorithm of an early mode analysis.

The subroutine step 420 is depicted in FIG. 10 in more detail.

Figure 7:
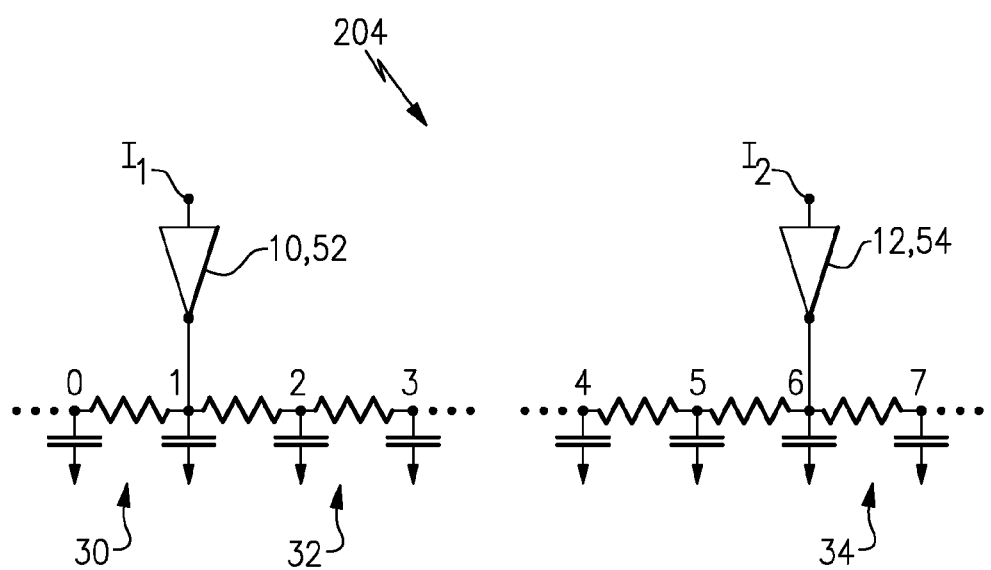
FIG. 7 a reduction of calculation steps for the RC model in FIG. 6.

In step 422 it is scanned through all nb pins Pi in a branch, e.g. branch 32 in FIG. 7 from left, with i=1 to nb. The branch extends between two pins outermost pins P1 to Pnb, e.g. branch 32 from pin P1 to pin P6 in FIG. 7. In step 424 the loop right of the actual pin Pi is opened and the arrival time ATl(Pi) is calculated and stored, preferably updated for the pin Pi if necessary. In step 426, an index k is actualized with k=nb−i+1. If i=1, then k=nb. If i=2, then k=nb−1 etc.

In step 428, the branch is opened left of pin Pk, the arrival time ATr(Pk) is calculated and, if necessary, the arrival time at pin Pk is updated. The signal flow of a signal correlated with index i is from one side, the signal flow of a signal correlated with k from the other side. Under certain circumstances the pin Pk can be the same as Pi but normally Pk is different from Pi.

In step 430 it is verified if the index i≥k, i.e. if all pins in between the outermost pins have been considered. If the answer is no, then it is verified in step 440 if the calculations of the arrival times ATl and ATr at the pins have been stopped and if i>nb. If yes, the subroutine ends and returns to the main routine shown in FIG. 9 at step 444.

If the answer in step 430 is yes, then it is verified in step 432 if the arrival time ATl(Pi)≥ATr(Pi) at the actual index i of the iteration. If the answer is no, then the calculation for ATl(Pi) is stopped in step 434. If the answer is yes, then it is verified in step 436 if ATr(Pk)≥ATl(Pk). If the answer is no, then the calculation is stopped in step 438. If the answer is yes, then in step 440 it is verified if the ATl and ATr calculations have stopped and i>nb. If the answer is no, then the next i is fetched in step 442 and the iteration restarts at step 424 for the next pin pair. If the answer is yes, then the subroutine ends and returns to the main routine in FIG. 9 at step 444.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of networks adapters.

Figure 11:
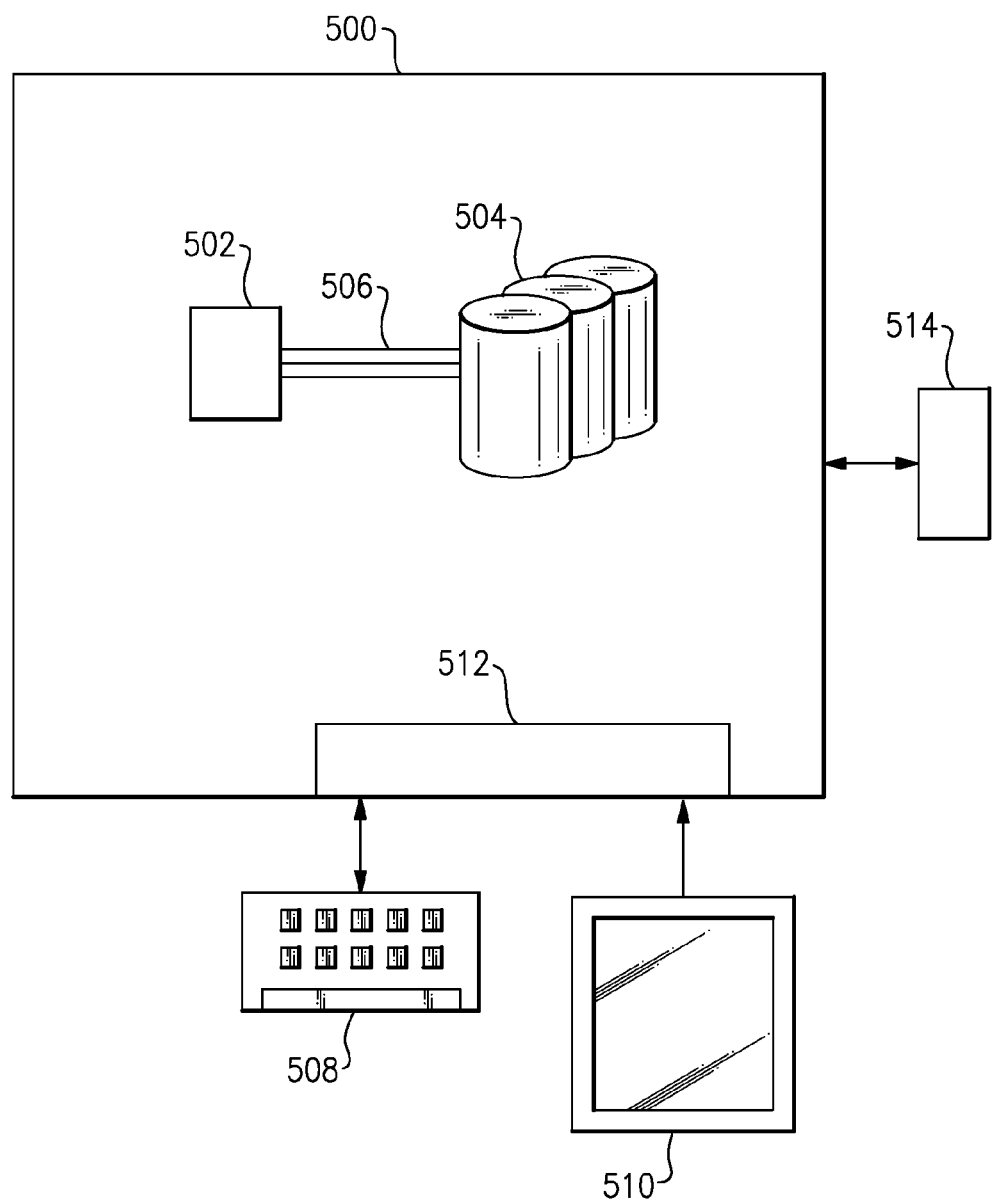
FIG. 11 a preferred data processing system for performing a preferred method according to the invention.

FIG. 11 depicts schematically a data processing system, consisting of a computer 500 comprising a central processing unit 502, a computer usable medium, comprising computer readable program 504 connected by a bus system 506 to the central processing unit 502, an IO system connected to input and output devices 508, 510. The computer is further connected to a network communication unit 514. The said data processing system comprises software code portions for performing a delay calculation method according to at least one of the preferred embodiments of the invention when said program is run on said computer 500.

The invention claimed is:

1. A method for calculating a timing delay in a repeater network in an electronic circuit, said repeater network comprising a plurality of driving cells, comprising:
   implementing at least one loop comprising one or more pins and one or more driving cells for driving the loop, wherein each driving cell in the loop is arranged between two branches of the loop;
   for each driving cell, opening the loop a plurality of times per driving cell, with one open at a time;
   calculating an arrival time of a signal at each sink of the repeater network for the one open at a time per driving cell;
   storing the arrival time; and
   repeating the calculation step and the storing step until the arrival time is available for each of the opens per driving cell.

2. The method according to claim 1, wherein the arrival time is a maximum possible delay.

3. The method according to claim 1, wherein the arrival time is a minimum possible delay.

4. The method according to claim 1, wherein for calculating the arrival time corresponding to a maximum possible delay, 3 opens are produced with one open in one of two branches emanating from the actual driving cell, one open in the other of the two branches emanating from the actual driving cell, and a disconnection of the driving cell itself from the loop.

5. The method according to claim 4, wherein 3N timing delay calculations are performed, wherein N is the number of driving cells in the repeater network.

6. The method according to claim 1, wherein for calculating the arrival time corresponding to a maximum possible delay, 2 opens are produced with one open in one of two branches emanating from the actual driving cell, and one open in the other of the two branches emanating from the actual driving cell, and one open on each side of each sink.

7. The method according to claim 6, wherein 2N timing delay calculations are performed, wherein N is the number of driving cells in the repeater network.

8. The method according to claim 1, wherein for calculating the arrival time corresponding to a minimum possible delay, 2 opens are produced with one open in one of the two branches emanating from the actual driving cell and one open in the other of the two branches emanating from the actual driving cell, and one open on each side of each sink.

9. The method according to claim 8, wherein 2(N+M) timing delay calculations are performed, wherein N is the number of driving cells in the repeater network and M is the number of last stage sinks.

10. The method according to claim 8, wherein after calculating the arrival time of the signal at each pin of the loop and storing the calculated arrival time, for each branch in the loop the steps are performed:
calculating the arrival time for each pin for one open at a time in the branch, wherein the arrival time is calculated alternating from both sides of the actual branch included between two pins yielding a first and a second arrival time for each pin; and
storing the arrival time for each open in the branch.

11. The method according to claim 10, wherein the calculation of the arrival time is aborted when the arrival time is calculated at a pin for the second time.

12. The method according to claim 10, wherein the calculation of the arrival time is aborted when the second arrival time at the actual pin is larger than the first arrival time at the actual pin.

13. The method according to claim 1, wherein a maximum and a minimum value of the arrival time is stored for each pin in the loop.

14. A system for calculating a timing delay, the system comprising:
an electronic circuit;
a repeater network in said electronic circuit, wherein said repeater comprises a plurality of driving cells;
wherein the system is configured to perform operations comprising:
implementing at least one loop comprising one or more pins and one or more driving cells for driving the loop, wherein each driving cell in the loop is arranged between two branches of the loop;
for each driving cell, opening the loop a plurality of times per driving cell, with one open at a time;
calculating an arrival time of a signal at each sink of the repeater network for the one open at a time per driving cell;
storing the arrival time; and
repeating the calculation step and the storing step until the arrival time is available for each of the opens per driving cell.

15. The system according to claim 14, wherein for calculating the dedicated arrival time corresponding to a maximum possible delay, 2 opens are produced with one open in one of two branches emanating from the actual driving cell, and one open in the other of the two branches emanating from the actual driving cell, and one open on each side of each sink.

16. The system according to claim 14, wherein for calculating the arrival time corresponding to a minimum possible delay, 2 opens are produced with one open in one of the two branches emanating from the actual driving cell and one open in the other of the two branches emanating from the actual driving cell, and one open on each side of each sink.

17. A computer program product for calculating a timing delay, the computer program product comprising:
a storage medium readable by a processing circuit and storing instructions for execution by the processing circuit for performing a method comprising:
implementing at least one loop comprising one or more pins and one or more driving cells for driving the loop, wherein each driving cell in the loop is arranged between two branches of the loop;
for each driving cell, opening the loop a plurality of times per driving cell, with one open at a time;
calculating an arrival time of a signal at each sink of the repeater network for the one open at a time per driving cell;
storing the arrival time; and
repeating the calculation step and the storing step until the arrival time is available for each of the opens per driving cell.

18. The computer program product according to claim 17, wherein for calculating the arrival time corresponding to a maximum possible delay, 2 opens are produced with one open in one of two branches emanating from the actual driving cell, and one open in the other of the two branches emanating from the actual driving cell, and one open on each side of each sink.

19. The computer program product according to claim 17, wherein for calculating the arrival time corresponding to a minimum possible delay, 2 opens are produced with one open in one of the two branches emanating from the actual driving cell and one open in the other of the two branches emanating from the actual driving cell, and one open on each side of each sink.

20. The computer program product according to claim 19, wherein after calculating the arrival time of the signal at each pin of the loop and storing the calculated arrival time, for each branch in the loop the steps are performed:
calculating arrival time for each pin for one open at a time in the branch, wherein the arrival time is calculated alternating from both sides of the actual branch included between two pins yielding a first and a second arrival time for each pin; and
storing the arrival time for each open in the branch.

* * * * *